(12) United States Patent
Carlson et al.

(10) Patent No.: US 6,201,189 B1
(45) Date of Patent: Mar. 13, 2001

(54) COAXIAL DROP CABLE HAVING A MECHANICALLY AND ELECTRONICALLY CONTINUOUS OUTER CONDUCTOR AND AN ASSOCIATED COMMUNICATIONS SYSTEM

(75) Inventors: Bruce J. Carlson; Alan N. Moe, both of Hickory; David H. Pixley, Newton, all of NC (US)

(73) Assignee: CommScope, Inc., Catawba, NC (US)

(*) Notice: Subject to any disclaimer, the term of this patent is extended or adjusted under 35 U.S.C. 154(b) by 839 days.

(21) Appl. No.: 08/489,680

(22) Filed: Jun. 13, 1995

(51) Int. Cl.⁷ ...................................................... H01B 7/18
(52) U.S. Cl. ...................................... 174/102 R; 174/107
(58) Field of Search ................................ 174/107, 36, 28, 174/102 R, 106 R (56) References Cited

U.S. PATENT DOCUMENTS

| | | |
|---|---|---|
| 1,794,902 | 3/1931 | Johnson . |
| 2,788,425 | 4/1957 | Tudbury ............................ 219/10.53 |
| 3,038,055 | 6/1962 | Ross ...................................... 219/8.5 |
| 3,196,241 | 7/1965 | Foxx et al. ............................. 219/8.5 |
| 3,233,066 | 2/1966 | Stoddard et al. ...................... 200/105 |
| 3,242,299 | 3/1966 | Laughlin et al. ...................... 219/8.5 |
| 3,315,025 | 4/1967 | Tomlinson ............................ 174/107 |
| 3,344,228 | 9/1967 | Woodland et al. ................... 174/107 |
| 3,399,449 | 9/1968 | McGean et al. ..................... 29/477.7 |
| 3,430,330 | 3/1969 | Garner .................................... 29/429 |
| 3,439,142 | 4/1969 | McGean et al. ....................... 219/9.5 |
| 3,529,340 | 9/1970 | Polizzano et al. .................... 29/202.5 |
| 3,567,846 | 3/1971 | Brorein et al. ....................... 174/102 |
| 3,639,674 | 2/1972 | Stier ....................................... 174/36 |
| 3,662,090 | 5/1972 | Grey ..................................... 174/107 |
| 3,681,515 | 8/1972 | Mildner ............................... 174/107 |
| 3,795,540 | 3/1974 | Mildner ............................... 117/226 |
| 3,874,076 | 4/1975 | Tsukamoto et al. .................... 29/624 |
| 3,876,495 * | 4/1975 | Esler ............................... 161/178 X |
| 3,927,247 | 12/1975 | Timmons .............................. 174/36 |
| 3,968,918 | 7/1976 | Merle .................................. 228/148 |
| 3,971,879 | 7/1976 | Rosenberg et al. .................... 174/36 |
| 4,104,481 | 8/1978 | Wilkenloh et al. ..................... 174/28 |
| 4,327,248 | 4/1982 | Campbell ............................. 174/107 |
| 4,472,595 | 9/1984 | Fox et al. ............................... 174/36 |
| 4,811,888 | 3/1989 | Ziemek et al. ....................... 228/148 |
| 5,249,731 | 10/1993 | Ziemek ................................ 228/148 |

\* cited by examiner

*Primary Examiner*—Kristine Kincaid
*Assistant Examiner*—Chau N. Nguyen
(74) *Attorney, Agent, or Firm*—Alston & Bird LLP (57) ABSTRACT

The communications system transmits both communications signals and electrical power to a plurality of subscribers. The communications signals can include video, voice and data signals. The communications system includes a coaxial drop cable for transmitting both the communications signals and electrical power from a cable tap to at least one subscriber of the communications system. The coaxial drop cable includes an annular outer conductor surrounding the dielectric material and having a mechanically and electrically continuous, non-overlapping tubular metallic shield. The coaxial drop cable has predetermined signal transmission characteristics, including enhanced shielding properties, which are maintained while the coaxial drop cable is flexed due, at least in part, to an increase in the stiffness of the dielectric material relative to the outer conductor. In particular, the dielectric material has a predetermined compressive stiffness of at least 1000 pounds per linear inch while the outer diameter of the outer conductor is less than about 0.04 inches. In addition, the outer conductor typically has a predetermined thickness which is at least 2.5% of the outer diameter of the outer conductor. Accordingly, the coaxial drop cable effectively transmits both communications signals and electrical power while providing enhanced shielding and relatively low electrical resistance and attenuation.

15 Claims, 2 Drawing Sheets

COAXIAL DROP CABLE HAVING A MECHANICALLY AND ELECTRONICALLY CONTINUOUS OUTER CONDUCTOR AND AN ASSOCIATED COMMUNICATIONS SYSTEM

FIELD OF THE INVENTION

The present invention relates generally to communications cables and, more particularly, to coaxial drop cables and associated communications systems.

BACKGROUND OF THE INVENTION

Coaxial cables are widely used for transmitting analog signals, such as RF cable television signals, to a number of subscribers. These coaxial cables can generally be classified into two distinct categories, namely, trunk and distribution coaxial cables, hereinafter referred to as distribution cables, and coaxial drop cables. Distribution cables and coaxial drop cables generally form very different portions of a coaxial cable communications system and serve different purposes therein.

In particular, distribution cables typically extend across relatively long distances and, accordingly, must transmit the RF signals with a minimum of resistance and attenuation. Consequently, distribution cables provide signal transmission without significant loss in signal strength or integrity. However, since distribution cables do generally extend across relatively long distances, the distribution cables are typically relatively large cables. For example, the outer conductor of a conventional distribution cable can have an outer diameter of 0.50 inches or larger. In addition, distribution cables are relatively stiff in comparison to conventional coaxial drop cables. For example, the minimum bend radius of conventional distribution cables is typically 4 inches or greater. Due, at least in part, to their size and rigidity, distribution cables are generally durable and can physically withstand the rigors of extending across relatively long distances while providing signal transmission having relatively low loss. In addition, although distribution cables are relatively inflexible, distribution cables are not typically required to twist or turn sharply.

In contrast, coaxial drop cables are typically used as the last link in a cable TV system to bring the cable TV signal from a distribution cable, passing near the subscriber's home, directly into the subscriber's home. Coaxial drop cables are generally relatively flexible such that the coaxial drop cables can be readily installed in a variety of environments, such as installation sites, both underground and aerial, in which the coaxial drop cable must be sharply turned and twisted. As known to those skilled in the art, the flexibility of a cable is a measurement of the force required to bend or deform the cable. Coaxial drop cables generally extend from a cable tap to at least one subscriber or subscriber of a communications system. As known to those skilled in the art, a cable tap is operatively connected to a respective distribution cable so as to divert at least a portion of the communications signals to the coaxial drop cable.

Coaxial drop cables generally include a coaxial cable core consisting of a center conductor, typically formed of copper clad steel, and a dielectric material surrounding the center conductor. Coaxial drop cables also include an outer conductor which surrounds the dielectric material. In order to provide a coaxial drop cable with the necessary flexibility, coaxial drop cables typically have an outer conductor which includes a flexible metallic braid overlying a thin overlapping flexible metallic foil wrap. Due to the overlapping construction of the flexible metallic foil wrap, the outer conductor is discontinuous, thereby reducing the shielding provided by the coaxial drop cable. In addition, metallic braid of a conventional coaxial drop cable is particularly leaky electrically at relatively high frequencies. Accordingly, signals may leak from the outer conductor creating interference at the subscriber's home. Alternatively, electrical noise may enter the cable from other electronics at the subscriber's home.

One measure of the shielding provided by a coaxial cable is the shielding effectiveness of the cable. Shielding effectiveness is typically defined as the attenuation of electrical signals in a generally radial direction through the outer conductor of the cable. For example, the shielding effectiveness of conventional coaxial drop cables at radio frequencies is generally between about to 80 dB and about 115 dB. Due, at least in part, to the ingress of noise into the cable, the coaxial drop cable may not be able to support interactive or two-way video, for example.

In addition, the discontinuous outer conductor can allow moisture or other environmental contaminants to reach the cable core, thereby corroding the center and outer conductors. The shielding provided by conventional coaxial drop cables also typically deteriorates with flexure of the cables. For example, the overlapping foil wrap can crack upon flexure of the cable to further decrease the electrical shielding effectiveness of the cable and to increase the possibility of moisture ingress.

Attempts have been made to improve various components of the coaxial drop cable. For example, U.S. Pat. No. 4,691,081 to Gupta et al. discloses a coaxial drop cable having an improved foil wrap comprising a metal foil layer and a polymer supporting layer fusibly bonded directly to the foil shield layer and serving to structurally reinforce the foil shield layer. U.S. Pat. No. 4,701,575 to Gupta et al. discloses a corrosion-inhibiting powder disposed between the outer conductor comprising a foil shield and braided reinforcing covering and the outer protective plastic jacket.

Coaxial cables, including both distribution cables and coaxial drop cables, typically form a portion of a communications system. In addition to the coaxial cable, conventional communications systems generally include a head end or central office which supplies the communications signals, such as RF cable television signals, to the system. The signals can then be transmitted, such as by an optical fiber trunk cable, from the central office to one or more optical node units, typically located in a neighborhood. The optical node unit can, in turn, convert the optical signals transmitted by the fiber optic trunk cable to corresponding electrical signals. Distribution cable, as described above, generally extends from the optical node unit to transmit the electrical signals across relatively long distances within the neighborhood. A cable tap can be connected to the distribution cable to divert at least a portion of the communications signals to one or more subscribers. A coaxial drop cable of the type described above having an outer conductor consisting of a flexible metallic braid overlying a metallic foil wrap typically extends between the cable tap and each subscriber in order to deliver the communication signals to the subscriber. Accordingly, analog signals, such as RF cable television signals, can be delivered to the subscriber via the communications system.

In addition to the communications system, each subscriber also generally subscribes to an electrical utility company for supplying electrical power to the subscriber. The electrical power provided by the electrical utility company is generally transmitted via an electrical distribution system which is separate and distinct from the aforementioned communications system.

Accordingly, while a subscriber can receive telephone signals via the communications system, a conventional wired telephone also requires electrical power in order to operate which must conventionally be obtained via the electrical distribution system. Thus, both the communications system and the electrical distribution system must be operating effectively in order for the subscriber to utilize their telephone.

In some instances, however, the electrical distribution system fails to provide power to a subscriber, including a subscriber's telephone, even though the communications system continues to provide communications signals to the subscriber. Due to the power failure, however, the subscriber is unable to utilize the communications system, such as to place a telephone call. This situation is annoying and, in some instances, dangerous since subscribers oftentimes depend upon telephonic communications for obtaining assistance in an emergency, such as by placing a 911 telephone call. However, in such instances in which the electrical distribution system is at least partially inoperative, the subscriber will be unable to place such an emergency telephone call even though the communications system is operative and available to transmit communications signals.

In view of recent changes in telecommunications architectures, it may also be desirable that a coaxial drop cable also carry high speed digital data communications and two-way video signals, instead of or in addition to conventional telephone service. In addition, for the reasons described above, it may also be desirable to remotely power termination electronics, such as wired telephones and a network interface device, at the subscriber's home. Unfortunately, the braided outer conductor of a conventional coaxial drop cable has relatively high electrical resistance that may preclude the efficient remote powering of termination electronics. In particular, the steel component of the center conductor has a relatively high electrical resistance that can preclude remote powering.

Further, the steel component of the center conductor is relatively hard and therefore has a tendency to create scratches or nicks on the interior surface of a connector as the connector is installed on end portions of the coaxial drop cable. Accordingly, these scratches or nicks may eventually corrode causing an unacceptably high resistance level at the connector. Attenuation of the signal may increase and the electrical resistance may also increase further precluding the ability to carry remote powering on the conductors. The exposed steel end of the cable may also be subject to corrosion.

SUMMARY OF THE INVENTION

It is therefore an object of the present invention to provide a communications system for transmitting both communications signals and electrical power.

It is another object of the present invention to provide a reliable communications system to facilitate emergency telecommunications.

It is yet another object of the present invention to provide a coaxial drop cable for transmitting both communications signals and electrical power, such as for the remote powering of termination electronics.

It is still another object of the present invention to provide a coaxial drop cable having enhanced shielding properties and greater electrical uniformity creating, among other things, a higher signal return loss, while remaining relatively flexible.

It is a further object of the present invention to provide a coaxial drop cable having materials compatible with conventional connectors to thereby reduce corrosion.

These and other objects are provided, according to the present invention, by a communications system for transmitting both communications signals and electrical power to a plurality of subscribers. The communications system includes a coaxial drop cable for transmitting both the communications signals and electrical power to at least one subscriber. The coaxial drop cable has predetermined signal transmission characteristics, including enhanced shielding properties, due, at least in part, to an annular outer conductor formed of a mechanically and electrically continuous non-overlapping tubular metallic shield which effectively shields the coaxial drop cable. In addition, the coaxial drop cable remains sufficiently flexible to enable the coaxial cable to be sharply turned and twisted during installation while maintaining predetermined signal transmission characteristics.

In addition to the coaxial drop cable, the communications system includes a centralized power source for providing electrical power to at least a portion of the communications system and a network of distribution cables for transmitting the communications signals throughout the communications system. The communications system also includes a cable tap, operably connected to a distribution cable, for diverting at least a portion of both the communications signals transmitted by the respective distribution cable and the electrical power provided by the centralized electrical power source. The coaxial drop cable is connected to the cable tap and transmits both the communications signals and electrical power diverted by the cable tap to at least one subscriber.

The communications system can also include receiver means, such as a network interface device, associated with at least one subscriber of the communications system and operably connected to the coaxial drop cable. The receiver means detects and electrically separates the communications signals and the electrical power transmitted by the coaxial drop cable. For example, the receiver means can separate the communications signals into voice, video and data signals, each of which are separate and distinct from the electrical power also transmitted by the coaxial drop cable.

In one advantageous embodiment, the communications system is a hybrid fiber/coaxial cable system and also includes a central office for providing communications signals to the communications system and a fiber optic trunk cable for transmitting the communications signals provided by the central office to a plurality of optical nodes. The optical nodes, in turn, convert the optically transmitted communications signals to electrical communications signals and provide the electrical communications signals to at least one distribution cable for further transmission throughout the communications system. The centralized power source can also be associated with a respective optical node so as to provide electrical power to a plurality of subscribers via each of the distribution cables operatively connected to the optical node. Accordingly, the number of power sources required by the communications system can be reduced, thereby reducing both the cost and complexity of the communications system.

The coaxial drop cable of the present invention includes an elongate center connector comprised of a conductive material, such as copper. A dielectric material, such as closed cell polyethylene, surrounds and adheres to the center connector. The dielectric material preferably has a predetermined stiffness so as to further support the outer conductor and to prevent buckling. The predetermined stiffness of the dielectric material is preferably at least 1000 pounds per linear inch and, in one advantageous embodiment, is between about 1000 pounds per linear inch and about 1800 pounds per linear inch. In order to increase the stiffness of the dielectric material, the dielectric material of one embodiment has a predetermined density of at least 0.30 g/cm$^3$ and, in one advantageous embodiment, a predetermined density of about 0.35 g/cm$^3$.

The annular outer conductor, also formed of an electrically conductive material such as aluminum or copper, surrounds and adheres to the dielectric material. The outer conductor includes a mechanically and electrically continuous, non-overlapping, tubular metallic shield having a predetermined outer diameter of no greater than 0.40 inches and, in one embodiment, an outer diameter of no greater than 0.32 inches and, in advantageous one embodiment, an outer diameter of no greater than 0.25 inches such that the cable is relatively flexible.

In order to remain structurally intact and to resist cracking or fracturing as the cable is repeatedly flexed, however, the outer conductor of the coaxial drop cable preferably has a predetermined thickness of at least 0.006 inches. In other words, the outer conductor has a predetermined thickness which is at least 2.5% of the outer diameter of the outer conductor. Due to the design of the coaxial drop cable, the coaxial drop cable can efficiently transmit electrical power and can be readily flexed while maintaining its predetermined signal transmission characteristics, including the enhanced shielding properties and the increased electrical uniformity.

In addition, the tubular metallic shield of the outer conductor can include a pair of abutting non-overlapping, lengthwise extending edge portions. The lengthwise extending edge portions can be joined, such as by a longitudinally extending welded seam which joins the pair of edge portions to thereby form the mechanically and electrically continuous tubular metallic shield. Further, the coaxial drop cable can also include a protective jacket surrounding the annular outer conductor.

Accordingly, the communications system of the present invention effectively transmits both communications signals and electrical power to a plurality of subscribers. The subscribers can therefore utilize the communications systems even in instances in which the electrical distribution system is inoperative. For example, the subscriber can continue to obtain assistance in an emergency, such as by placing a 911 telephone call. This concurrent transmission of both communications signals and electrical power is provided, at least in part, by the coaxial drop cable of the present invention which includes a mechanically and electrically continuous outer conductor. By appropriately designing the coaxial drop cable to have a relatively small size and a sufficiently dense dielectric material, the coaxial drop cable can be readily flexed and can have a relatively small minimum bend radius so as to provide for efficient installation while maintaining the predetermined signal transmission characteristics, including the enhanced shielding properties and relatively low resistance and attenuation, of the cable.

DETAILED DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figures 1, 5:
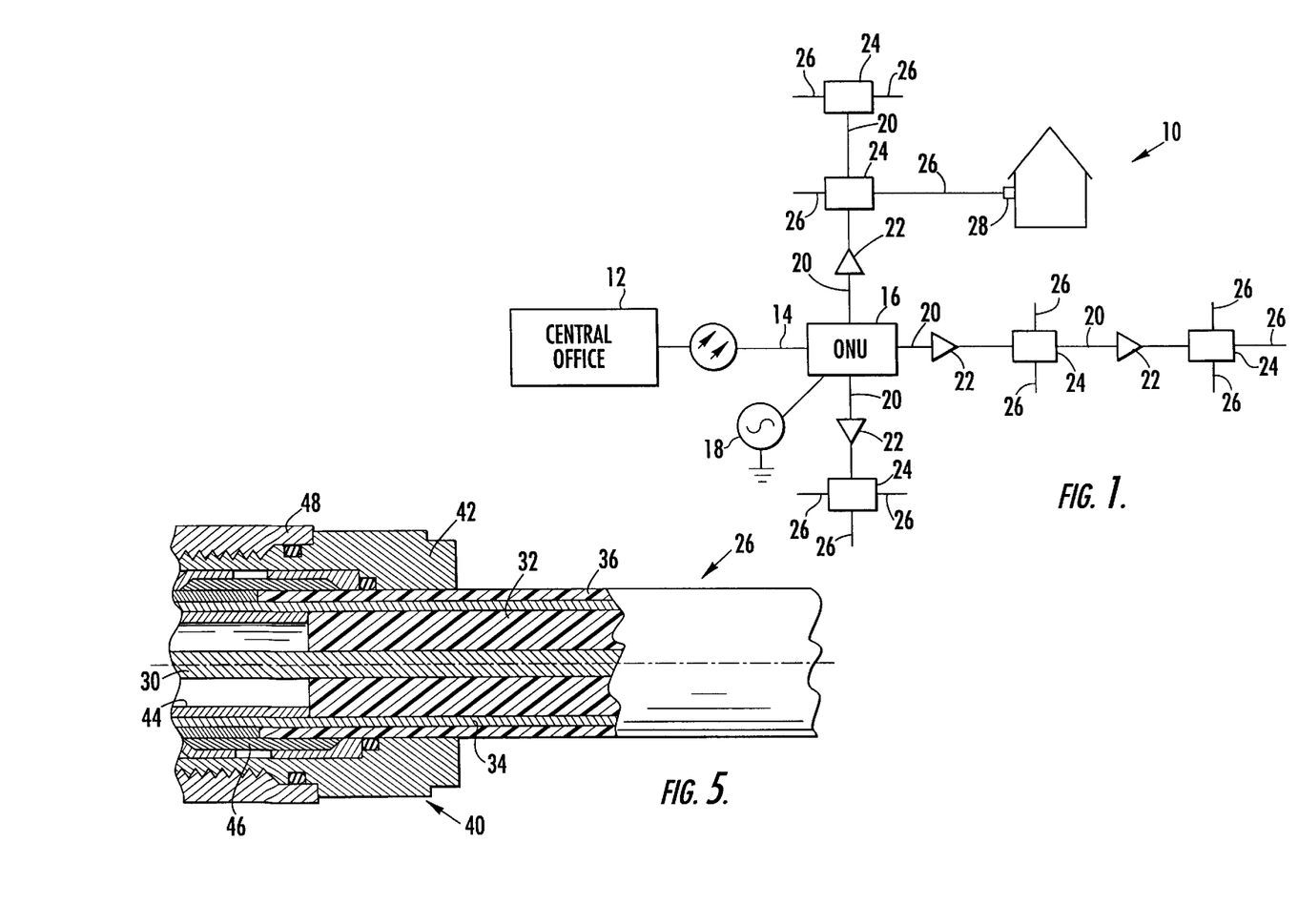
FIG. 1 is a schematic representation of a communications system according to one embodiment of the present invention.
FIG. 5 is a longitudinal fragmentary cross-sectional view of a portion of a connector and the end portion of a coaxial drop cable according to one embodiment of the present invention to which the connector is mounted.

Referring now to FIG. 1, a communications system 10 according to one embodiment of the present invention is illustrated. As shown, the communications system typically includes a central office or head end 12. The central office provides or originates the communications signals which are transmitted throughout the communications system to a plurality of subscribers. Due to the enhanced signal transmission characteristics of the communications system, the communications signals can include both analog and digital signals and, more particularly, can include voice, video and data signals. In addition, the communications system of the present invention can support bidirectional communications, such as two-way video.

The central office 12 typically transmits communications signals to a plurality of optical nodes 14 which are positioned within various neighborhoods, for example. In order to efficiently transmit the communications signals from the central office to the plurality of optical nodes across a distance which can oftentimes be significant, the communications system 10 can include a fiber optic trunk cable 16 extending therebetween. Accordingly, in these instances, the communications system is a hybrid fiber coaxial cable system. However, the communications system can, instead, include a distribution cable, that is, a trunk and distribution coaxial cable, which extends between the central office and a plurality of nodes for transmitting the communications signals generated by the central office to the plurality of nodes without departing from the spirit and scope of the present invention.

Figures 2, 3, 4:
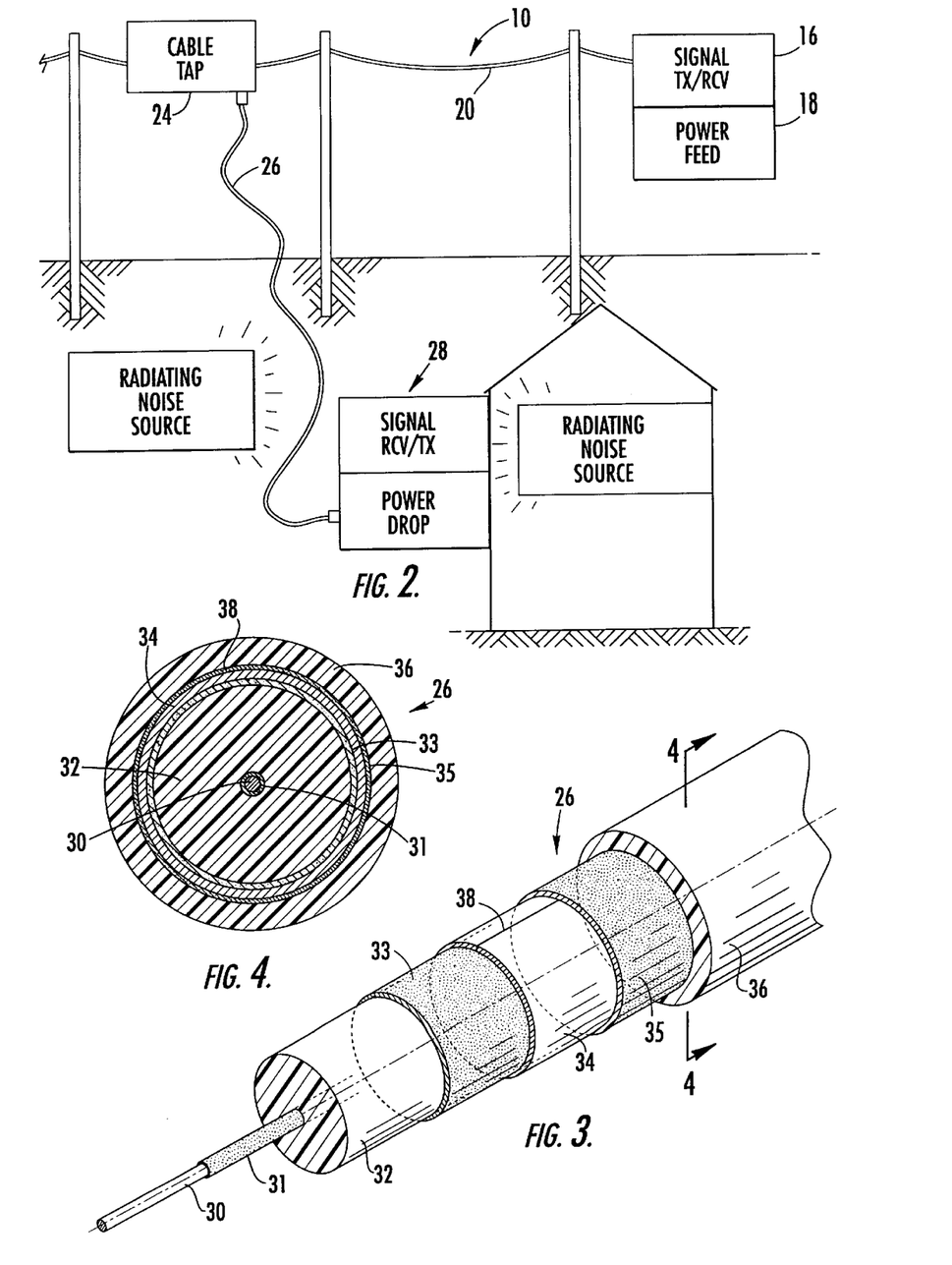
FIG. 2 is a block diagram view of a portion of a communications system according to one embodiment of the present invention illustrating the enhanced shielding performance of the coaxial drop cable according to one embodiment of the present invention.
FIG. 3 is an exploded fragmentary perspective view of an end portion of a coaxial drop cable according to one embodiment of the present invention.
FIG. 4 is a greatly enlarged lateral cross-sectional view of a coaxial drop cable taken along line 4—4 of FIG. 3.

In embodiments in which a fiber optic trunk cable 16 transmits the communications signals from the central office 12 to the plurality of optical nodes 14, the optical nodes convert the optically transmitted communications signals to electrical communications signals, such as RF signals, as shown in FIG. 2. The communications system 10 can also include a centralized power source 18, preferably associated with a respective optical node, for providing electrical power to at least a portion of the communications system as also shown in FIG. 2. For example, the centralized power source can provide a 60 Hz 90 volt signal and can deliver up to 80 amps in some embodiments.

After the optically transmitted communications signals have been converted to electrical communications signals, the electrical communications signals can be transmitted from the optical node 14 via one or more distribution cables 20. For example, the distribution cable can be a QR-type coaxial cable manufactured by CommScope, Inc. and described in U.S. Pat. No. 4,472,595 to Steve A. Fox et al. which issued Sep. 18, 1984, the contents of which are expressly incorporated herein. As schematically illustrated in FIG. 1, three distribution cables or feeder legs extend outwardly or downstream of the optical node. However, the communications system 10 can include any number of distribution cables in order to distribute the communications signals and electrical power to one or more subscribers without departing from the spirit and scope of the present invention.

Since the centralized power source 18 is associated with a respective optical node 14, the centralized power source can supply electrical power to a plurality of subscribers via each of the distribution cables 20 extending outwardly from the optical node. Accordingly, the cost and complexity of the communications system 10 of the present invention can be reduced by reducing the number of necessary power sources.

As also illustrated schematically in FIG. 1, the communications system can include one or more RF amplifiers 22 which can be operably connected to a respective distribution cable 20 for amplifying the communications signals transmitted thereby. The communications system 10 can also include one or more cable taps 24. In particular, a cable tap, such as a power passing cable tap, is operably connected to a distribution cable 20 and diverts at least a portion of the communications signals transmitted by the respective distribution cable. In addition, the cable tap diverts at least a portion of the electrical power provided by the centralized electrical power source 18.

As also shown in FIGS. 1 and 2, the communications system 10 of the present invention includes a coaxial drop cable 26, operably connected to a cable tap 24, for transmitting both the communications signals and the electrical power diverted by the cable tap to at least one subscriber of the communications system. The cable tap can feed or supply a number of coaxial drop cables which, in turn, are routed to different subscribers. In addition, a distribution cable 20 can extend downstream of the cable tap for further distributing both the communications signals and the electrical power within the neighborhood.

The communications signals and electrical power transmitted by the coaxial drop cable 26 can be received, detected and electrically separated by receiver means 28, such as a network interface device. The receiver means is specifically associated with at least one subscriber of the communications system 10. In particular, the receiver means 28 can electrically separate the communications signals into voice, video and data signals which are, in turn, appropriately routed to the subscriber's equipment, such as the subscriber's telephone, television and computer, respectively. In addition, the receiver means separates the electrical power from each of these types of communications signals and also provides electrical power to the subscriber's termination electronics, including the subscriber's telephone and the network interface device itself. Accordingly, the subscriber can continue to access the communications system 10 and, consequently, continue to place telephone calls, such as emergency telephone calls, in instances in which the electrical distribution system is at least partially inoperable and is no longer delivering electrical power to the subscriber.

As illustrated schematically in FIG. 2, the receiver means 28 can include a transceiver for facilitating bidirectional communications, such as two-way video, via the respective coaxial drop cable 26. Accordingly, the subscriber can interactively communicate via the communications system 10 due, at least in part, to the enhanced signal transmission characteristics of the coaxial drop cable of the present invention as described below.

Furthermore, the communications system 10 of the present invention can concurrently transmit both communications signals and electrical power to a plurality of subscribers due, at least in part, to the coaxial drop cable 26 of the present invention. As illustrated in FIGS. 3 and 4, the coaxial drop cable includes an elongate center conductor 30 comprised of an electrically conductive material. Preferably, the center conductor is comprised of a relatively soft, low resistance material, such as copper, in order to effectively decrease the resistance and associated attenuation of the coaxial drop cable and to facilitate the connectorization of the coaxial drop cable without scratching or nicking the interior of the connector as described below.

The coaxial drop cable 26 also includes a dielectric material 32 which surrounds and electrically insulates the center conductor 30. The dielectric material is typically a low loss dielectric material, such as polyethylene, polystyrene or polypropylene and, in one advantageous embodiment, has an expanded cellular foam composition, such as closed cell polyethylene. The coaxial drop cable also includes an annular outer conductor 34 which surrounds the dielectric material. The outer conductor is also formed of an electrically conductive material, such as aluminum or copper.

The coaxial drop cable 26 can also include a protective jacket 36, typically comprised of a thermoplastic material, such as polyethylene, polyvinyl chloride, polyurethane or various rubbers, which is be formed about, and typically adhered to, the annular outer conductor 34 to further protect the coaxial drop cable 26 from environmental contaminants and from moisture ingress. In addition, the coaxial drop cable can include a water blocking tape 35 to further prevent moisture ingress as known to those skilled in the art.

In order to effectively transmit both electrical power and communications signals, including digital signals, and to provide for bidirectional communications, the coaxial drop cable 26 preferably has predetermined signal transmission characteristics, such as relatively low resistance, and, in particular, relatively low DC resistance. The coaxial drop cable also preferably has relatively high shielding properties, including relatively high shielding effectiveness. These shielding properties include both electrical shielding and mechanical shielding, such as the prevention of moisture ingress. In addition, the coaxial drop cable preferably has relatively low attenuation and relatively high signal return loss (SRL).

Accordingly, the annular outer conductor 34 includes a mechanically and electrically continuous, non-overlapping tubular metallic shield. A mechanically continuous outer conductor is continuous in both its longitudinal and circumferential extent so as to mechanically seal the cable against ingress of contaminants, such as moisture. The mechanical continuity of an outer conductor can be determined by measuring the uniformity of the physical properties of the outer conductor. In addition, an electrically continuous outer conductor is electrically conductive throughout its longitudinal and circumferential extent and effectively seals the cable against leakage of RF radiation. The electrical continuity of an outer conductor can be measured by the uniformity of the electric and magnetic fields external to the cable.

As illustrated in FIG. 4, the metallic shield includes a pair of lengthwise extending edge portions which are folded about the dielectric material 32 so as to abut in a non-overlapping relationship. The abutting lengthwise extending edge portions of the tubular metallic shield can then be joined, such as by a longitudinally extending welded seam 38, to form a mechanically and electrically continuous tubular metallic shield.

The mechanically and electrically continuous outer conductor 34 also increases the tensile strength of the coaxial drop cable 26 of the present invention in comparison with conventional coaxial drop cables. Accordingly, the center conductor 30 can be comprised of a softer material, such as copper, having increased electrical conductivity but reduced tensile strength, as compared with the copper clad steel center conductors of conventional coaxial drop cables, since the center conductor need not contribute as significantly to the overall tensile strength of the coaxial drop cable having a mechanically and electrically continuous outer conductor.

Since the annular outer conductor 34 is both mechanically and electrically continuous, the coaxial drop cable 26 provides greater electrical uniformity and enhanced shielding performance, including enhanced RF and EMI shielding performance. For example, the coaxial drop cable 26 of one embodiment of the present invention can provide RF shielding of greater than 120 dB. Accordingly, communications signals, including digital communications signals, can be effectively transmitted via the coaxial drop cable while maintaining the integrity of the signal transmission.

In addition, the coaxial drop cable 26 of the present invention has relatively low resistance, such as relatively low DC loop resistance, in order to effectively transmit the communications signals and, in particular, the electrical power to the subscriber without significant loss or attenuation. Accordingly, the center conductor 30 of the coaxial drop cable 26 is preferably comprised of copper which has a relatively low resistivity. In addition, the mechanically and electrically continuous metallic sheath which forms the annular outer conductor 34 provides greater electrical uniformity, thereby effectively reducing the resistance of the outer conductor and, in turn, the DC loop resistance of the coaxial drop cable. For example, in one embodiment, the coaxial drop cable of the present invention has a DC loop resistance, that is, the sum of the individual resistances of the center conductor and the outer conductor, of about 6.5 Ω. In comparison, a conventional coaxial drop cable having a flexible metallic braid overlying a metallic foil wrap can have DC loop resistances of between about 20 Ω and 25 Ω. As a further comparison, a pair of twisted copper conductors (22 gauge) which oftentimes provide electrical power to a subscriber can have a DC loop resistance of between about 30 Ω and 35 Ω.

Accordingly, the communications system 10 and, in particular, the coaxial drop cable 26 of the present invention can provide both communications signals and electrical power directly to the subscriber without significant resistive loss or attenuation. Thus, the communications system can provide electrical power for powering at least the termination equipment or electronics of the subscriber. The termination electronics can include the network interface device 38 and the subscriber's telephone.

A coaxial drop cable 26, such as the coaxial drop cable of the present invention, must also be relatively flexible such that the coaxial drop cable can be readily installed since, in many instances, the coaxial drop cable must be sharply turned or twisted during the installation process. In addition, the coaxial drop cable preferably has a relatively small bending radius, such as less than about 3 inches and, in one advantageous embodiment, about 1 inch or less, prior to failing, that is, prior to buckling.

As known to those skilled in the art, buckling typically occurs on the compressive side of a bend in a coaxial cable since it is at this location that the tubular metallic sheath is in a state of maximum compressive load and the outer conductor most likely to disassociate from the dielectric material. As known to those skilled in the art, any buckling, flattening or collapsing of the tubular metallic sheath which might occur during installation has adverse, and oftentimes fatal, consequences on the signal transmission characteristics of the cable. In addition, buckling, flattening or collapsing also destroys the mechanical integrity of the cable and increases the possibility of moisture or contaminant ingress.

In order to support the compressive load to which the annular outer conductor 34 is subjected when the coaxial drop cable 26 of the present invention is bent and, consequently, prevent the disassociation of the outer conductor from the dielectric material 32, the various components of the coaxial drop cable preferably form an integral cable assembly, such that the entire cable moves and flexes as a unit. Preferably, the force required to elongate the coaxial drop cable of the present invention is less than the force required to buckle the cable such that the coaxial drop cable will deform prior to buckling. Furthermore, by establishing an integral coaxial drop cable wherein the outer conductor is in intimate contact with or bonded to the dielectric material which has greater relative flexural stiffness and elongational capability as described hereinbelow, the point at which buckling initially occurs can be extended and the minimum bending radius of the coaxial drop cable can be substantially lowered.

In particular, the dielectric material 32 is preferably adhered to the elongate center conductor 30 and the annular outer conductor 34 is, in turn, preferably adhered to the dielectric material. For purposes of illustration, first and second adhesive layers 31 and 33 are shown with greatly exaggerated relative thicknesses in FIGS. 3 and 4. While the cable components can be bonded with a variety of adhesives, one exemplary adhesive is a random copolymer of ethylene and acrylic acid, typically referred to as "EAA". Accordingly, the center conductor and the dielectric material can remain associated with and at least partially support the compressive load to which the annular outer conductor is subjected when the coaxial drop cable is bent. By supporting the annular outer conductor, the coaxial drop cable of the present invention does not fail or buckle until the cable is bent more sharply.

In order to further support the annular outer conductor, the stiffness or compression of the dielectric material 32 is preferably increased relative to the stiffness or compression of the outer conductor 34 such that the dielectric material serves a much greater role in contributing to the overall physical strength of the coaxial drop cable 26. In one advantageous embodiment in which the outer conductor is comprised of aluminum, the cable core, that is, the center conductor 30 and the dielectric material, has a first predetermined stiffness which is at least five times and, in one embodiment, ten times the second predetermined stiffness of the outer conductor. Accordingly, the ratio of the first predetermined stiffness of the cable core to the second predetermined stiffness of the aluminum outer conductor is preferably at least 5 and, in one embodiment, at least 10. In alternative embodiment in which the outer conductor is comprised of copper, the ratio of the first predetermined stiffness to the second predetermined stiffness is significantly less, such as at least 2 in one embodiment.

The compressive stiffness of the dielectric material 32 can be determined by placing a predetermined length, typically 1 inch, of the cable core, i.e., the center conductor 30 and the dielectric material, in a compressive load fixture, such as a universal tester, and deflecting the predetermined length of the cable core by a predetermined amount. For example, in one conventional test, the compressive stiffness of the dielectric material is determined based upon the force required to deflect the cable core by 12 k of its original diameter. In one preferred embodiment, the compressive stiffness of the dielectric material is at least about 1000 pounds per linear inch and, more preferably, is between about 1000 pounds per linear inch and about 1800 pounds per linear inch.

In order to provide a relatively stiff dielectric material 32, the dielectric material can have a predetermined density of at least 0.30 g/cm$^3$ and, in one advantageous embodiment, has a predetermined density of about 0.35 g/cm$^3$. By stiffening the dielectric material, such as by having a relatively dense dielectric material, the minimum bend radius of the coaxial drop cable 26 is reduced since the stiff dielectric material supports at least a portion of the annular outer conductor and extends the point at which the cable buckles.

In addition to increasing the density of the dielectric material 32, the stiffness of the outer conductor 34 of the coaxial drop cable 26 of the present invention is also reduced, such as by lowering the temper of the material forming the outer conductor and by reducing the cross-sectional area, i.e. wall thickness W, of the outer conductor. The cross-sectional area of the outer conductor is effectively limited by the relatively small cross-sectional size of the coaxial drop cable in comparison to a distribution cable. For example, the outer diameter of the outer conductor of the coaxial drop cable of the present invention is preferably no greater than 0.40 inches and, in one preferred embodiment, is no greater than 0.32 inches and, in one particularly advantageous embodiment, is no greater than 0.25 inches such that the coaxial drop cable can be readily flexed. Accordingly, the coaxial drop cable can be routed within the relatively limited spaces provided for coaxial drop cable installation.

In order to maintain the necessary flexibility, the thickness of the outer conductor 34 of the coaxial drop cable 26 of the present invention is also preferably relatively thin. For example, the outer conductor of one embodiment of the coaxial drop cable is preferably less than 0.015 inches and, in one advantageous embodiment, is less than 0.013 inches. However, unlike some types of distribution cable which reduce the stiffness of the outer conductor by thinning the wall thickness of the outer conductor, the wall thickness W of the outer conductor of the coaxial drop cable of the present invention must remain at least as great as a predetermined minimum thickness, such as 0.006 inches in one advantageous embodiment, in order to provide the predetermined signal transmission characteristics, including the enhanced shielding properties. Stated another way, the outer conductor of the coaxial drop cable of the present invention preferably has a predetermined thickness which is at least 2.5% of the outer diameter of the outer conductor.

In particular, by reducing the outer diameter of the relatively thin-walled outer conductor 34 of the coaxial drop cable 26 of the present invention, the flexibility of the resulting outer conductor can be significantly enhanced. Thus, the coaxial drop cable of the present invention which has a relatively stiff dielectric material 32, due, at least in part, to the relatively high density of the dielectric material, and a relatively thin outer conductor remains flexible while having a relatively small bending radius prior to failing or buckling. However, the coaxial drop cable continues to maintain the predetermined signal transmission characteristics, including the enhanced shielding properties and the reduced resistance and attenuation, as the cable is repeatedly flexed.

As illustrated in FIG. 5, a connector 40 can be connected to end portions of the coaxial drop cable 26 of the present invention. For clarity, only the rear portion of the connector which mates with the coaxial drop cable is shown and described below. However, the connector also includes an interface, such as a standard interface or a non-standard or custom interface. In addition, the connector can be either a feed-through type, a pin type or another type of connector as known to those skilled in the art without departing from the spirit and scope of the present invention.

As shown in FIG. 5, a portion of the dielectric material 32 is preferably cored or removed and the center conductor 30, outer conductor 34 and protective jacket 36 are trimmed prior to assembling the connector. The connector typically includes a back nut assembly 42 which is placed over the end portion of the coaxial drop cable 26 and an annular support mandrel or sleeve 44 which is inserted within the outer conductor as shown. An annular ferrule 46 can then be installed over the outer conductor and the protective jacket. The ferrule preferably has a nominal inner diameter which is slightly larger than the outer diameters of both the outer conductor and the protective jacket. However, the ferrule is advantageously adapted to be radially compressed.

Once the ferrule 46 has been installed, the back nut assembly 42 can by slid over a portion of the ferrule and a front nut assembly 48 can be installed. As shown in FIG. 5, the front nut assembly can be adapted to threadably engage the back nut assembly to form an integral connector assembly. In addition, the front nut assembly is preferably sized such that the threaded engagement of the front nut assembly with the rear nut assembly applies a radial inward force to the ferrule which, in turn, is crimped radially inward toward the annular support mandrel 44. Accordingly, the connector can be effectively secured to both the outer conductor 34 and the protective jacket 36 such that the good ohmic contact is established with the outer conductor.

According to one embodiment of the present invention, the center conductor 30 is preferably comprised of a relatively soft, electrically conductive material such as copper. Accordingly, the relatively soft center conductor should not scratch or otherwise nick the connector 40 during installation. Thus, the possibility of corrosion of the connector is effectively decreased due to the lack of scratches or nicks therein.

Accordingly, the communications system 10 of the present invention effectively transmits both communications signals and electrical power to a plurality of subscribers. The subscribers therefore can utilize the communications systems even in instances in which the electrical distribution system is inoperative since the communications system can continue to supply electrical power to the subscriber's termination electronics. Accordingly, the subscriber can seek emergency assistance, such as by placing a 911 call even though the subscriber's power is inoperative.

This concurrent transmission of both communications signals and electrical power is provided, at least in part, by the coaxial drop cable 26 of the present invention which includes a mechanically and electrically continuous outer conductor 34. By appropriately designing the coaxial drop cable, such as by adhering the various components of the cable into an integral cable assembly and by enhancing the stiffness of the dielectric material 32 relative to the stiffness of the outer conductor, the coaxial drop cable can be readily flexed to provide efficient installation while maintaining the predetermined signal transmission characteristics, including enhanced shielding properties and relatively low resistance and attenuation. As a result of these enhanced signal transmission characteristics, the communications system 10 and, in particular, the coaxial drop cable of the present invention can transmit a variety of communications signals including both analog and digital signals as well as voice, video and data signals. In addition, the communications system of the present invention effectively supports bidirectional communications, such as two-way video.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A coaxial drop cable having predetermined signal transmission characteristics, including enhanced shielding properties, for transmitting both communications signals and electrical power, wherein the coaxial drop cable is adapted to extend between a distribution cable of a communications system and receiver means associated with at least one subscriber of the communications system, the coaxial drop cable comprising:
    an elongate center conductor;
    a dielectric material surrounding said center conductor;
    an adhesive layer disposed between said center conductor and said dielectric material for bonding said dielectric layer to said center conductor; and
    an annular outer conductor surrounding said dielectric material and being adhesively bonded thereto to form an integral cable core, said outer conductor comprised of a mechanically and electrically continuous, non-overlapping, tubular metallic shield,
    wherein said dielectric material has a predetermined density of at least 0.30 g/cm$^3$ and a corresponding predetermined compressive stiffness of at least 1000 pounds per linear inch, and wherein said outer conductor has a predetermined thickness which is at least 2.5% of its outer diameter such that the coaxial drop cable can efficiently transmit electrical power and can be readily flexed while maintaining the predetermined signal transmission characteristics.

2. A coaxial drop cable according to claim 1 wherein the predetermined thickness of said outer conductor is at least 0.006 inch and a predetermined outer diameter of no greater than 0.40 inch such that the coaxial drop cable can be readily flexed.

3. A coaxial drop cable according to claim 2 wherein the predetermined outer diameter of said outer conductor is no greater than 0.32 inches.

4. A coaxial drop cable according to claim 1 wherein the predetermined compressive stiffness of said dielectric material is between about 1000 pounds per linear inch and about 1800 pounds per linear inch.

5. A coaxial drop cable according to claim 1 wherein said elongate center conductor is comprised of copper, and wherein said outer conductor is comprised of an electrically conductive material selected from a group consisting of aluminum and copper.

6. A coaxial drop cable according to claim 1 wherein said dielectric material is comprised of a closed cell polyethylene material.

7. A coaxial drop cable according to claim 1 wherein the tubular metallic shield of said outer conductor includes a pair of abutting, non-overlapping, lengthwise extending edge portions and a longitudinal welded seam joining the pair of edge portions to thereby form the mechanically and electrically continuous tubular metallic shield.

8. A coaxial drop cable according to claim 1 further comprising a protective jacket surrounding said annular outer conductor.

9. A coaxial drop cable having predetermined signal transmission characteristics, including enhanced shielding properties, for transmitting both communications signals and electrical power, wherein the coaxial drop cable is adapted to extend between a distribution cable of a communications system and receiver means associated with at least one subscriber of the communications system, the coaxial drop cable comprising:
    an elongate center conductor;
    a dielectric material surrounding said center conductor;
    an adhesive layer disposed between said center conductor and said dielectric material for bonding said dielectric layer to said center conductor; and
    an annular outer conductor surrounding said dielectric material and being adhesively bonded thereto to form an integral cable core, said outer conductor comprised of a continuous, smooth-walled, longitudinally welded, tubular metallic shield,
    wherein said dielectric material has a predetermined density of at least 0.30 g/cm$^3$ and a corresponding predetermined compressive stiffness of at least 1000 pounds per linear inch, and wherein said outer conductor has a predetermined thickness which is at least 0.006 inch and a predetermined outer diameter of no greater than 0.40 inch such that the coaxial drop cable can efficiently transmit electrical power and can be readily flexed while maintaining the predetermined signal transmission characteristics of the coaxial drop cable.

10. A coaxial drop cable according to claim 9 wherein the predetermined thickness of said outer conductor is at least 2.5% of its outer diameter such that the coaxial drop cable can be readily flexed.

11. A coaxial drop cable according to claim 9 wherein the predetermined outer diameter of said outer conductor is no greater than 0.32 inches.

12. A coaxial drop cable according to claim 9 wherein the predetermined compressive stiffness of said dielectric material is between about 1000 pounds per linear inch and about 1800 pounds per linear inch.

13. A coaxial drop cable according to claim 9 wherein said elongate center conductor is comprised of copper, and wherein said outer conductor is comprised of an electrically conductive material selected from a group consisting of aluminum and copper.

14. A coaxial drop cable according to claim 9 wherein said dielectric material is comprised of a closed cell polyethylene material.

15. A coaxial drop cable according to claim 9 wherein the tubular metallic shield of said outer conductor includes a pair of abutting, non-overlapping, lengthwise extending edge portions and a longitudinal welded seam joining the pair of edge portions to thereby form the mechanically and electrically continuous tubular metallic shield.

* * * * *

UNITED STATES PATENT AND TRADEMARK OFFICE
CERTIFICATE OF CORRECTION

PATENT NO. : 6,201,189 B1
DATED : March 13, 2001
INVENTOR(S) : Carlson et al.

It is certified that error appears in the above-identified patent and that said Letters Patent is hereby corrected as shown below:

<u>Title page, item [54], line 2, and column 1, line 2,</u>
In the title, "Electronically" should read -- Electrically --.

Signed and Sealed this

Thirtieth Day of October, 2001

Attest:

*Attesting Officer*

NICHOLAS P. GODICI
*Acting Director of the United States Patent and Trademark Office*